United States Patent [19]
Nishikawa

[11] Patent Number: 5,383,081
[45] Date of Patent: Jan. 17, 1995

[54] LIVE INSERTION CIRCUIT

[75] Inventor: Naofumi Nishikawa, Hyogo, Japan

[73] Assignee: Mitsubishi Denki Kabushiki Kaisha, Tokyo, Japan

[21] Appl. No.: 185,413

[22] Filed: Jan. 24, 1994

[30] Foreign Application Priority Data

Jan. 26, 1993 [JP] Japan ................. 5-029755

[51] Int. Cl.6 .............................................. H02H 9/06
[52] U.S. Cl. ...................................... 361/58; 361/110; 323/908; 336/DIG. 2
[58] Field of Search .................... 361/58; 323/908; 336/DIG. 2, 110, 136

[56] References Cited

U.S. PATENT DOCUMENTS 3,995,209 11/1976 Weston ................. 336/DIG. 2
4,405,965 9/1983 Weldon et al. ................ 361/58
5,153,804 10/1992 Pham et al. ................ 361/58

OTHER PUBLICATIONS

Katsuyuki Okada et al., "Physical Design Technologies for Network Node Processors", NTT R&D vol. 40, No. 10, 1991, pp. 1359–1370.

Primary Examiner—Todd DeBoer
Attorney, Agent, or Firm—Rothwell, Figg, Ernst & Kurz

[57] ABSTRACT

The live insertion circuit of the present invention comprises a movable magnetic body for changing an inductance of a variable inductor, and the movable magnetic body is moved toward a supporting member by a rod at the time of inserting the package into the unit. At this time, an inductance of the variable inductor is changed according to the connection condition of terminals for connecting the package and the unit, thus suppressing a surge current.

14 Claims, 11 Drawing Sheets

LIVE INSERTION CIRCUIT

BACKGROUND OF THE INVENTION

1. Field of the Invention

The invention relates to a live insertion circuit which enables live insertion of only packages in need of maintenance while power is supplied to a maintenance system for maintaining a power station or the like when commercial power service is cut.

2. Description of the Prior Art

Figure 14:
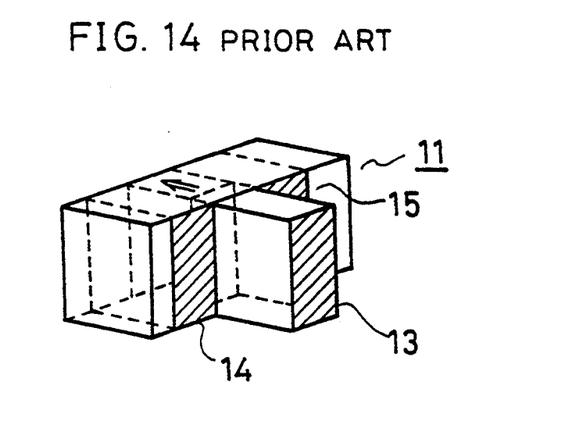
FIG. 14 is a diagram showing how the insertion package is inserted into the mounting unit in the present invention and the prior art.
Figure 15:
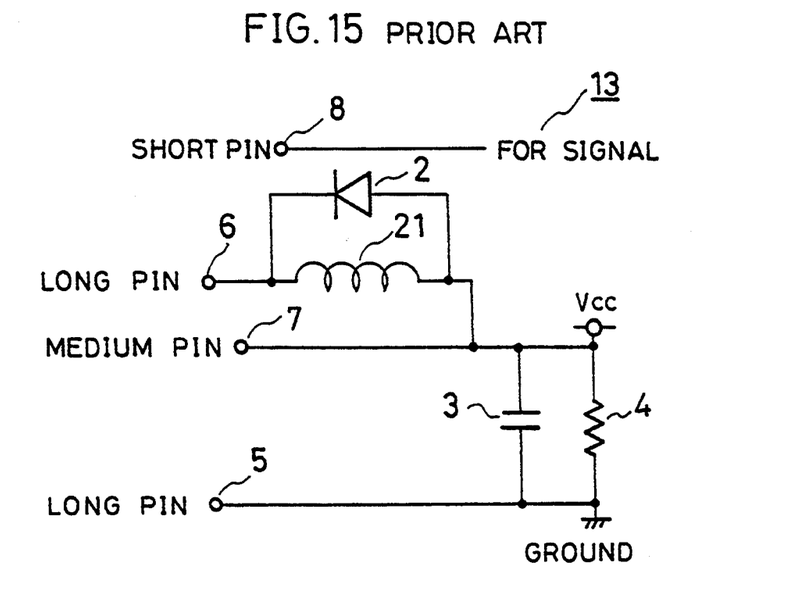
FIG. 15 is a circuit diagram of a live insertion circuit of the prior art.
Figure 16:
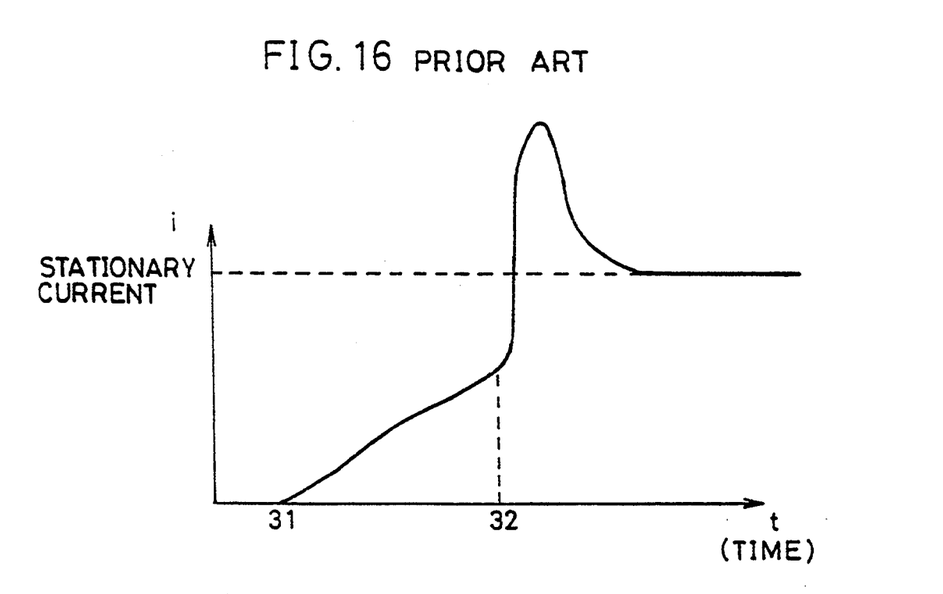
FIG. 16 is a time-current characteristic diagram showing the amount of current supplied to the insertion package in the mounting unit when an inductance of the inductor is too high in the prior art.
Figure 17:
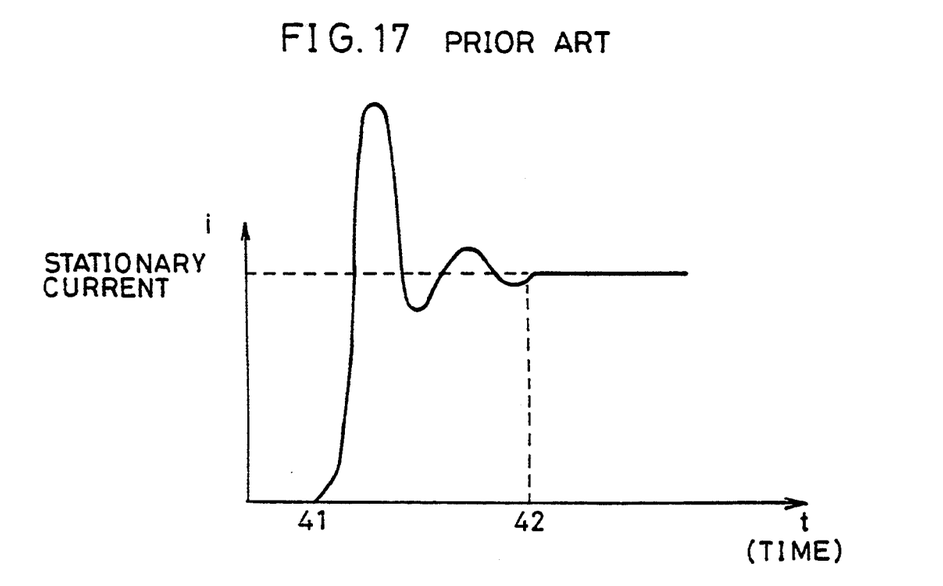
FIG. 17 is a time-current characteristic diagram showing the amount of current supplied to the insertion package in the mounting unit when an inductance of the inductor is too small in the prior art.

FIG. 14 is a diagram illustrating how an insertion package is inserted into a mounting unit. In the figure, reference numeral 11 represents a mounting unit, and 13, 14 and 15 insertion packages to be inserted into the mounting unit 11. Examples of the insertion package include hard disks and logic cards. FIG. 15 shows a prior art live insertion circuit described in "Physical Design Technologies for Network Node Processors", NTT's R&D Technical Bulletin, Vol. 40, No. 10, 1991. In FIG. 15, reference numerals 6 and 7 represent power line terminals, 5 a ground line terminal, and 8 a signal line terminal. These terminals differ in pin length: the power line terminal 6 and the ground line terminal 5 are long pins, the power line terminal 7 a medium pin, and the signal line terminal 8 a short pin. This live insertion circuit is present on the insertion package 13 which is inserted into the mounting unit 11, whereby power is supplied to each circuit within the insertion package 13 through the mounting unit 11 and the live insertion circuit shown in FIG. 15. A load 4 indicates a power load on the entire insertion package 13. In FIG. 15, reference numeral 21 indicates an inductor, 2 a diode for short-circuiting a reverse voltage which is generated in the inductor 21 when the package is pulled out, and 3 a bypass capacitor. FIG. 16 and FIG. 17 show changes in electric current with the elapse of time when the package is inserted. In other words, these figures show the amount of current supplied to the insertion packages 13, 14, 15 in the mounting unit 11 from a power source when a value of the inductor 21 is too large or too small. In FIGS. 16 and 17, reference numerals 31 and 41 indicate the times when the long pin terminals 5 and 6 are connected, and 32 and 42 the times when the short pin terminal 8 is connected. The power terminal 6 is referred to as "long-pin terminal", the power terminal 7 "medium-pin terminal", the ground line terminal 5 "long-pin terminal", and the signal line terminal 8 "short-pin terminal" hereinafter.

A description is subsequently given of the operation of the live insertion circuit. It is supposed that the insertion packages 14 and 15 are already inserted into the mounting unit 1 and put into operation. At this time, suppose that there arises the need to add another insertion package 13 in order to increase capacity and improve performance. The insertion package 13 is inserted into the mounting unit while the insertion packages 14 and 15 are kept in operation. In case of live insertion of the insertion package 13, the terminals may be damaged by the generation of a large surge current caused by the charging current of the bypass capacitor 3 and a current flow into the load, or the power voltage of the mounting unit 11 may be temporarily lowered by quick discharge of a charge by a surge current, resulting in the malfunction of the insertion packages 14 and 15 in operation.

To prevent the malfunction of the insertion packages, the live insertion circuit of the prior art is designed to eliminate sudden changes in power current. In other words, to insert the insertion package 13 into the mounting unit 11, the long-pin terminals 5, 6 of the live insertion circuit shown in FIG. 15 are first connected to the mounting unit 11. Thereby, a current begins to flow into the insertion package 13 through the inductor 21. However, due to the presence of the inductor 21, a surge current does not flow into the bypass capacitor 3 and the load 4, and the insertion package is gradually applied by a current and charged. Thereafter, when the medium-pin terminal 7 is connected, a current flows into the bypass capacitor 3 bypassing the inductor 21, but the bypass capacitor 3 is charged to a certain extent with a charge supplied from the long-pin terminal 6, and a potential thereof is raised. In consequence, a surge current is smaller than when the insertion package 13 is inserted into the mounting unit 11 without the long-pin terminals 5 and 6. The, after the power system of the insertion package 13 is stabilized, the short-pin terminal 8 is connected.

As described above, the live insertion circuit of the prior art employs such a countermeasure against an error caused by a surge current, but it is not adequate. That is, when the insertion package is inserted, if a value of the inductor 21 is too large, as shown in FIG. 16, at the time 31 when the long-pin terminals are connected, there is no sudden change in current, but a time constant is high, and at the time 32 when the medium-pin terminal is connected, a surge current flows into the bypass capacitor 3 since the bypass capacitor 3 is not fully charged. And, if a value of the inductor 21 is too small, as shown in FIG. 17, a surge current flows in at the time 41 when the long-pin terminals are connected. The prevention of a surge current is not perfect at non-continuous points of impedance where pin terminals are put into contact or separated. Therefore, the prior art live insertion circuit has problems such as an error caused by fluctuations in power voltage, a short service life of terminals by an overcurrent resulting from a surge current, and noise interference to other package signal lines.

SUMMARY OF THE INVENTION

The present invention is intended to solve the above described problems, and it is therefore an object of the invention to provide a live insertion circuit wherein an electric current does not change significantly at the time when long-pin and medium-pin terminals are connected in live insertion, thereby protecting terminals, stabilizing the power supply system and preventing noise interference.

According to the present invention, there is provided a live insertion circuit which comprises a variable inductor between the mounting unit having a power circuit and an insertion package having a load and operation means for controlling the variable inductor to maintain a high inductance when the connectors of both the unit and the package are placed in contact and to reduce the inductance after they are connected.

In the live insertion circuit of the present invention, the variable inductor comprises a hollow coil portion and a movable magnetic body which is movably inserted into this coil portion, and the above-described operation means is positioned facing the end of the movable magnetic body to push the magnetic body out of the coil portion 63 at the time of inserting the connector.

Moreover, in the live insertion circuit of the present invention, the variable inductor comprises a hollow coil portion and a movable magnetic body which is movably inserted into this coil portion, and the above-described operation means comprises a control circuit for generating an output signal according to the position of the connector of the package at the time of inserting the connector and a magnetic body driving portion which operates on the output signal from this control circuit to change the position of the movable magnetic body.

Furthermore, in the live insertion circuit of the present invention, the variable inductor comprises a hollow coil portion and a movable magnetic body which is movably inserted into the coil portion, and the above-described operation means comprises a potential detector for detecting a potential between the variable inductor 1 and the load at the time of inserting the connector, a control circuit for generating a signal corresponding to a potential detected by the potential detector, and a magnetic body driving portion which operates on the output signal from this control circuit to change the position of the movable magnetic body.

According to the present invention, the operation means maintains a high inductance of the variable inductor when the connectors of the unit and packages are placed in contact, and reduces the inductance after they are connected.

According to the present invention, the operation means is positioned facing the end of the movable magnetic body 64 so that the movable magnetic body 64 is pulled out of the coil portion 63 at the time of inserting the connector, whereby an inductance of the variable inductor 1 is reduced.

According to the present invention, an output signal corresponding to the position of the connector of the package at the time of inserting the connector is generated by the control circuit 93, and the magnetic body driving portion 90 changes the position of the movable magnetic body 64 based on the output signal from the control circuit 93. Thereby, an inductance of the variable inductor 1 is changed.

According to the present invention, the potential detector 102 detects a potential between the variable inductor 1 and the load at the time of inserting the connector, the control circuit 103 generates a signal corresponding to the detection signal of the potential detector 102, and the magnetic body driving portion 100 changes the position of the movable magnetic body based on the output signal of the control circuit 103. Thereby, an inductance of the variable inductor 1 is changed.

The above and other objects, features an advantages of the invention will become more apparent from the following description when taken in conjunction with the accompanying drawings.

DESCRIPTION OF THE PREFERRED EMBODIMENT

Embodiment 1

Figure 1:
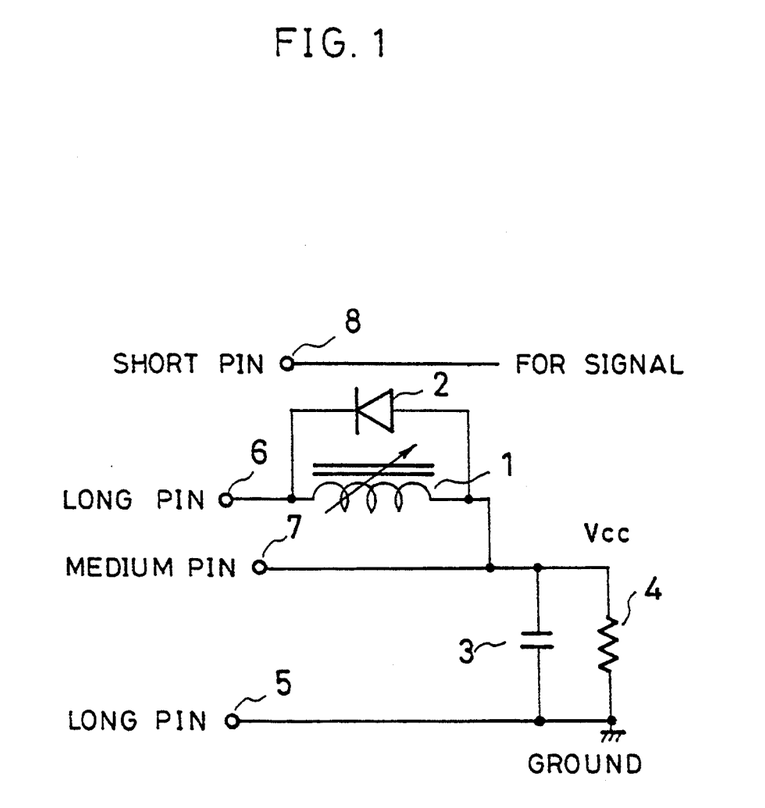
FIG. 1 is a circuit diagram of a live insertion circuit according to Embodiment 1 of the present invention.

FIG. 1 is a circuit diagram of a live insertion circuit according to a first embodiment of the invention. In the figure, the same components as those of FIG. 15 have the same reference codes and, accordingly, their descriptions are omitted. According to the first embodiment, the live insertion circuit comprises a variable inductor 1 whose inductance is variable. The mounting unit 11 and the insertion packages 13, 14, 15 are structured the same as in FIG. 14.

Figure 2:
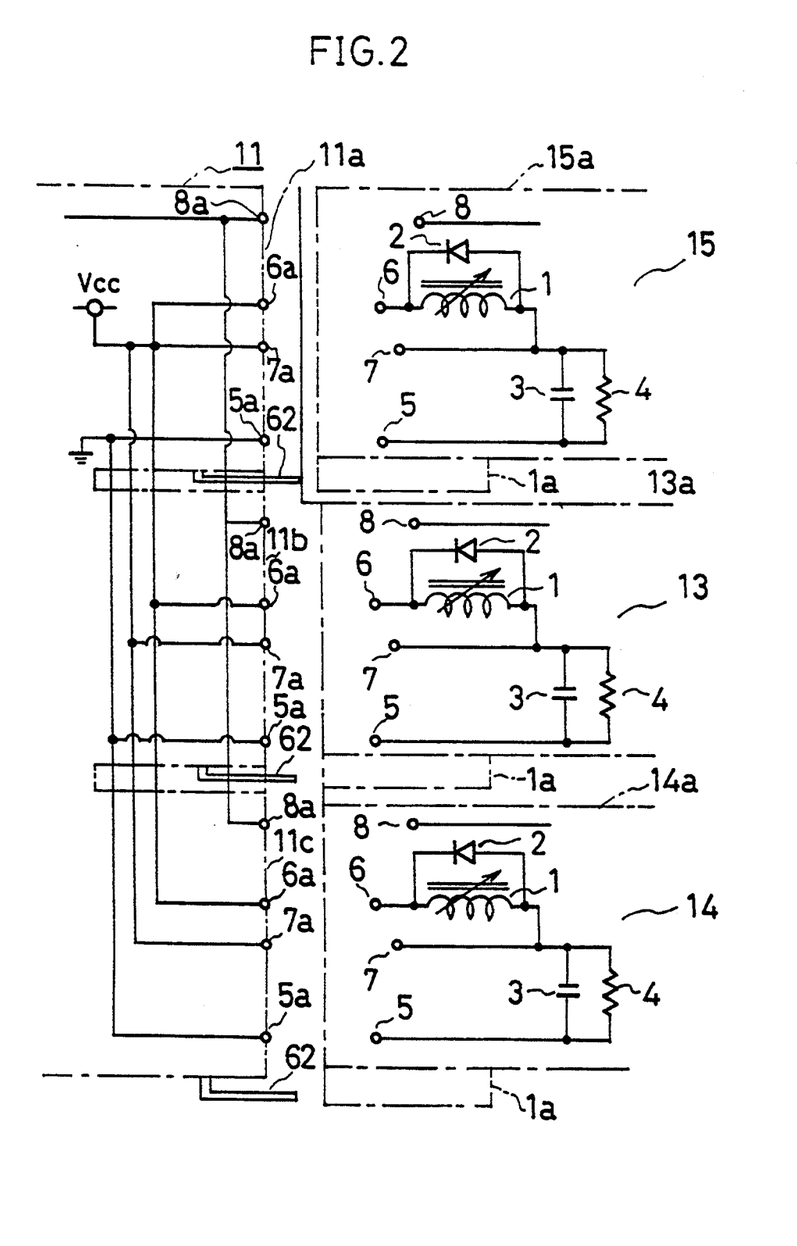
FIG. 2 is a circuit diagram showing the relationship between the connector of the mounting unit and the connector of the insertion package in Embodiment 1.
Figure 3:
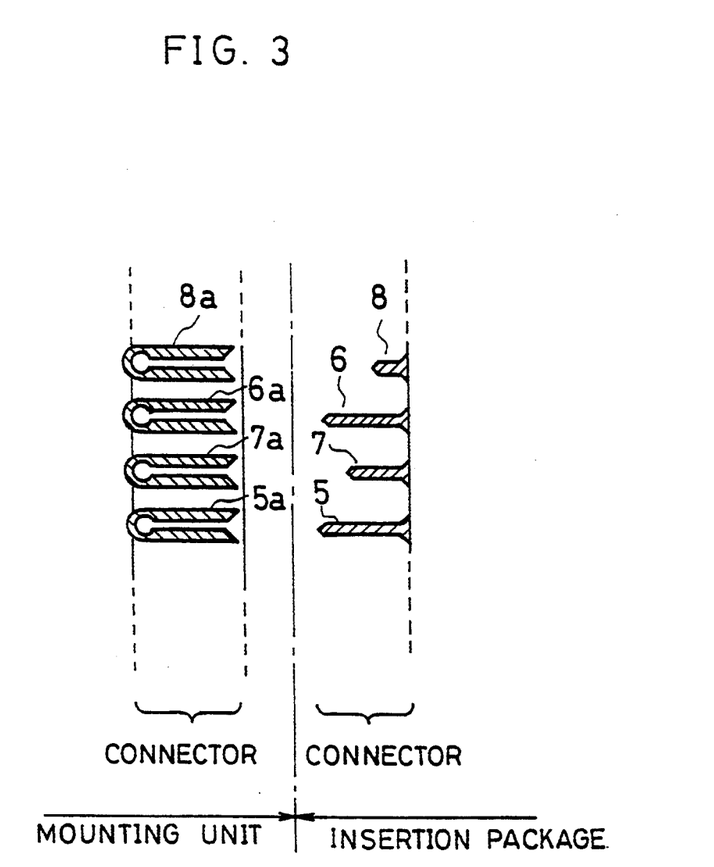
FIG. 3 is a structural diagram of the connector terminals of the mounting unit and the insertion package in Embodiment 1.
Figure 4:
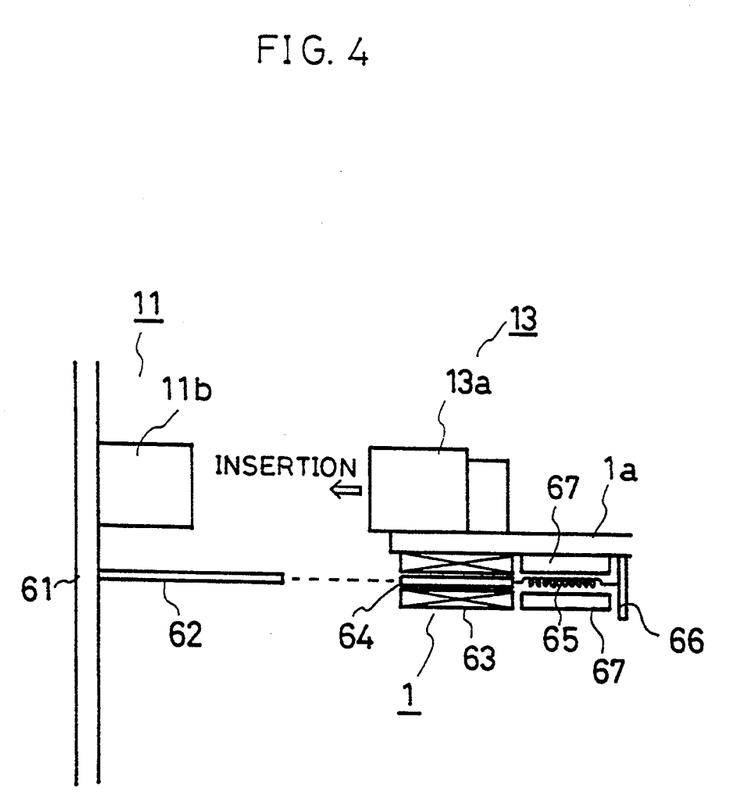
FIG. 4 is a structural diagram illustrating means provided on the variable inductor for moving the movable magnetic body in Embodiment 1.

FIG. 2 is a circuit diagram showing the relationships between the connectors 11a, 11b, 11c of the mounting unit 11 and the connectors 13a, 14a, 15a of the insertion packages 13, 14, 15 to be connected to the connectors 11a, 11b, 11c. In Embodiment 1, the live insertion circuit of FIG. 1 is included in the insertion packages 13, 14, 15 (more specifically, in the connectors 13a, 14a, 15a). In this case, each of the connectors 11a, 11b, 11c has female terminals 8a, 6a, 7a, 5a as shown in FIG. 3, and each of the connectors 15a, 13a, 14a to be connected to these connectors 11a, 11b, 11c has a male short-pin terminal 8, long-pin terminal 6, medium-pin terminal 7 and long-pin terminal 5 which differ in length. These female terminals are engaged with the male terminals in the order of the long-pin terminals 6a and 5a, the medium-pin terminal 7a and the short-pin terminal 8a. As shown in FIG. 4, the variable inductor 1 is attached to a substrate 1a provided at the outer end of the connectors 15a, 13a, 14a, and a movable magnetic body 64 is inserted into a hollow portion of a coil portion 63 of the variable inductor 1. This movable magnetic body 64 is urged toward the mounting unit 11 by a spring 65. However, the movement of the movable magnetic body 64 toward the mounting unit 11 is restricted by a stopper 67. The rear end of the spring 65 is supported by a supporting member 66. On the side of the connectors 11a, 11b, 11c of the mounting unit 11, a rod 62 is fixed to the backboard 61, extending toward the movable magnetic body 64 inserted into the variable inductor 1.

With such an arrangement, when the connectors 13a, 14a, 15a of the insertion packages 13, 14, 15 are inserted into the connectors 11a, 11b, 11c of the mounting unit 11, the movable magnetic body 64 is pressed by the rod 62, moved toward the insertion packages against the force of the spring 65 and finally pulled out of the coil portion 63 from the rear end thereof so that an inductance of the variable inductor 1 decreases gradually. When the connectors 13a, 14a, 15a are removed, an inductance gradually increases due to the reverse operation.

Figure 5:
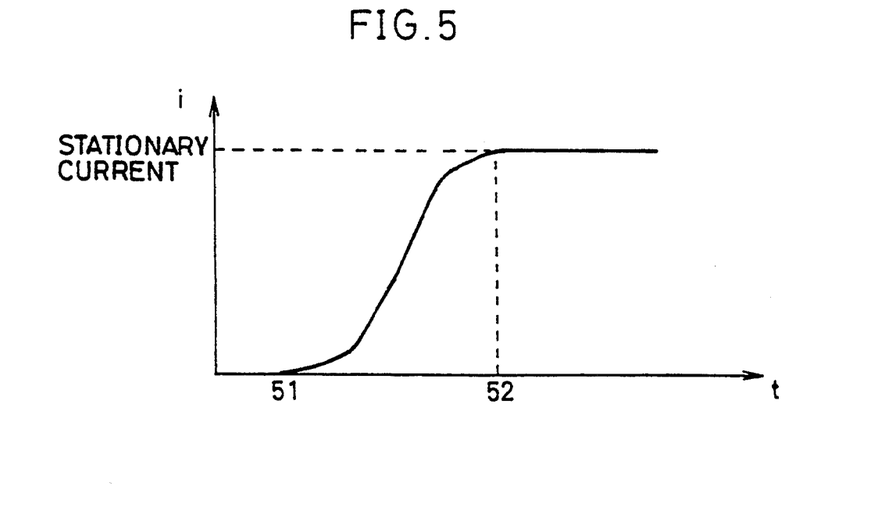
FIG. 5 is a time-current characteristic diagram showing the amount of current supplied to the insertion package in the mounting unit in Embodiment 1.

FIG. 5 is a time-current characteristic diagram showing the amount of current supplied to the insertion package in the mounting unit according to Embodiment 1. In the figure, reference numeral 51 indicates the time when the long-pin terminals are connected in the process of inserting the insertion package into the mounting unit, and 52 the time when the medium-pin terminal is connected. An abnormal current is not generated at the times 51 and 52 where impedance is not continuous. The supply current then becomes stationary.

Figure 6:
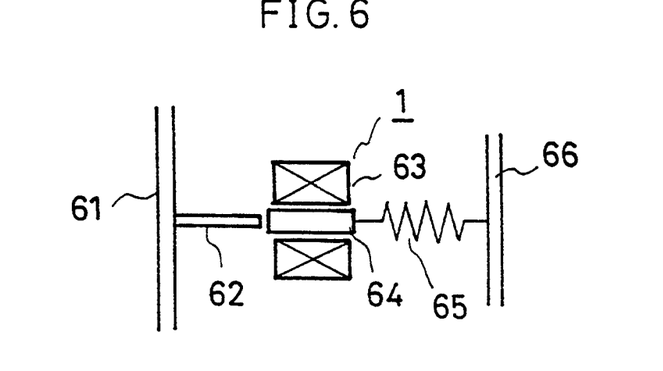
FIG. 6 is a diagram explaining the operation of Embodiment 1.
Figure 7:
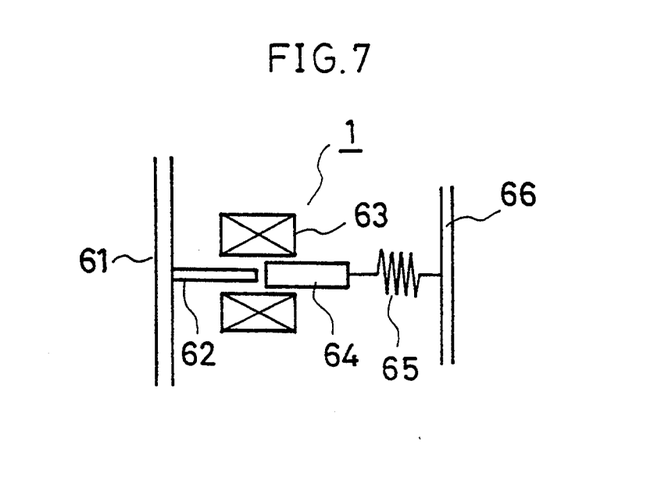
FIG. 7 is a diagram explaining the operation of Embodiment 1.

FIG. 6 is a diagram illustrating the state of the variable inductor 1 before the insertion package is inserted into the mounting unit. FIG. 7 is a diagram illustrating the state of the variable inductor 1 after the package is inserted into the mounting unit. FIGS. 6 and 7 correspond to FIG. 4, but are simplified to facilitate understanding. In FIGS. 6 and 7, reference numeral 61 represents the backboard of the mounting unit, 63 a coil portion, 64 a movable magnetic body, 62 a rod for pushing the movable magnetic body 64, 65 a spring, and 66 a supporting member on the insertion package.

With reference to FIGS. 1 to 7 and 14, a description is given of the operation of Embodiment 1. In Embodiment 1, the insertion package 13 is to be inserted into the mounting unit 11. In the process of inserting the insertion package 13 into the mounting unit 11, the long-pin terminals 5, 6 of the connector 13a of the insertion package 13 are first placed in contact with the terminals 5a, 6a of the connector 11b of the mounting unit 11, respectively. At this time, as shown in FIG. 6, as the movable magnetic body 64 remains in the coil portion 63, an inductance of the variable inductor 1 is extremely high, and, accordingly, a change in current flow from the long-pin terminal 6 is small as shown by the current waveform at the time 51 in FIG. 5. Thereafter, when the insertion package 13 continues to be inserted, the rod 62 pushes the movable magnetic body 64 in the coil portion 63 towards the supporting member 66 by the same distance as the insertion package moves into the mounting unit as shown in FIG. 7. As a result, an inductance of the variable inductor 1 decreases, a current change rate increases, and supply current to the insertion package 13 reaches a stationary value quickly. In other words, the charging of the bypass capacitor 3d reaches almost a stationary state. When the insertion package is inserted farther, the medium-pin terminal 7 is engaged with the terminal 7a. At this time, most of the movable magnetic body 64 is pushed out of the coil portion 63 by the rod 62, and an inductance of the variable inductor 1 is almost "0". Therefore, even when the medium-pin terminal 7 is connected, impedance remains unchanged. Therefore, no surge current is generated and supply current has such a waveform as shown in FIG. 5 at the time 52, thus exerting no adverse effect on other circuits. In Embodiment 1, the movable magnetic body 64 is pushed by the rod 62 as shown in FIG. 4, but the rod 62 may be a movable magnetic body.

Embodiment 2

Figure 8:
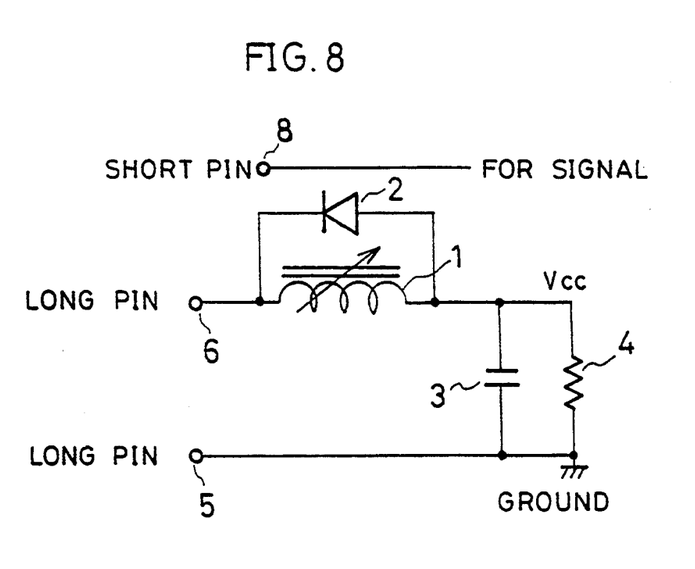
FIG. 8 is a circuit diagram of a live insertion circuit according to Embodiment 2 of the invention.

The medium-pin terminal can be omitted as shown in Embodiment 2 of FIG. 8 when an impedance of the variable inductor 1 can be reduced sufficiently by pushing the movable magnetic body 64 out of the coil portion 63 at the time when the long-pin terminals are connected, or when there is no possibility of a surge current flowing in due to a small load capacity at the time when the short-pin terminal is connected.

Embodiment 3

Figure 9:
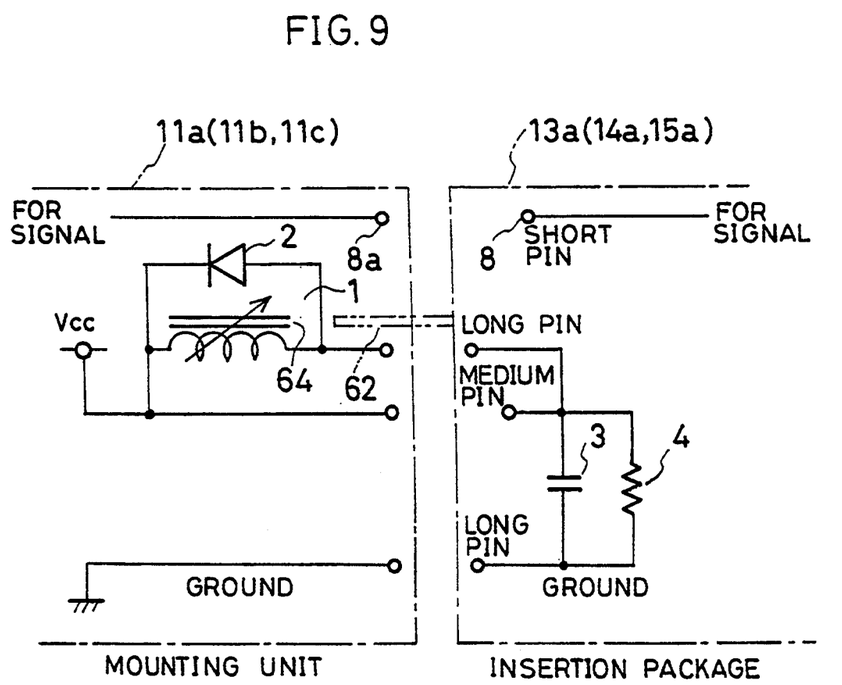
FIG. 9 is a circuit diagram showing the connectors of the mounting unit and the insertion package of Embodiment 3.

FIG. 9 shows a live insertion circuit according to Embodiment 3 of the present invention. In the above-described Embodiments 1 and 2, the live insertion circuit is present on the insertion package. In Embodiment 3, the live insertion circuit is mounted on the mounting unit as shown in FIG. 9. The circuit operates based on the same principle as Embodiment 1. However, in this case, the rod 62 for pushing the movable magnetic body 64 to change inductance is provided on the connectors 13a, 14a, 15a of the insertion packages 13, 14, 15.

Embodiment 4

Figure 10:
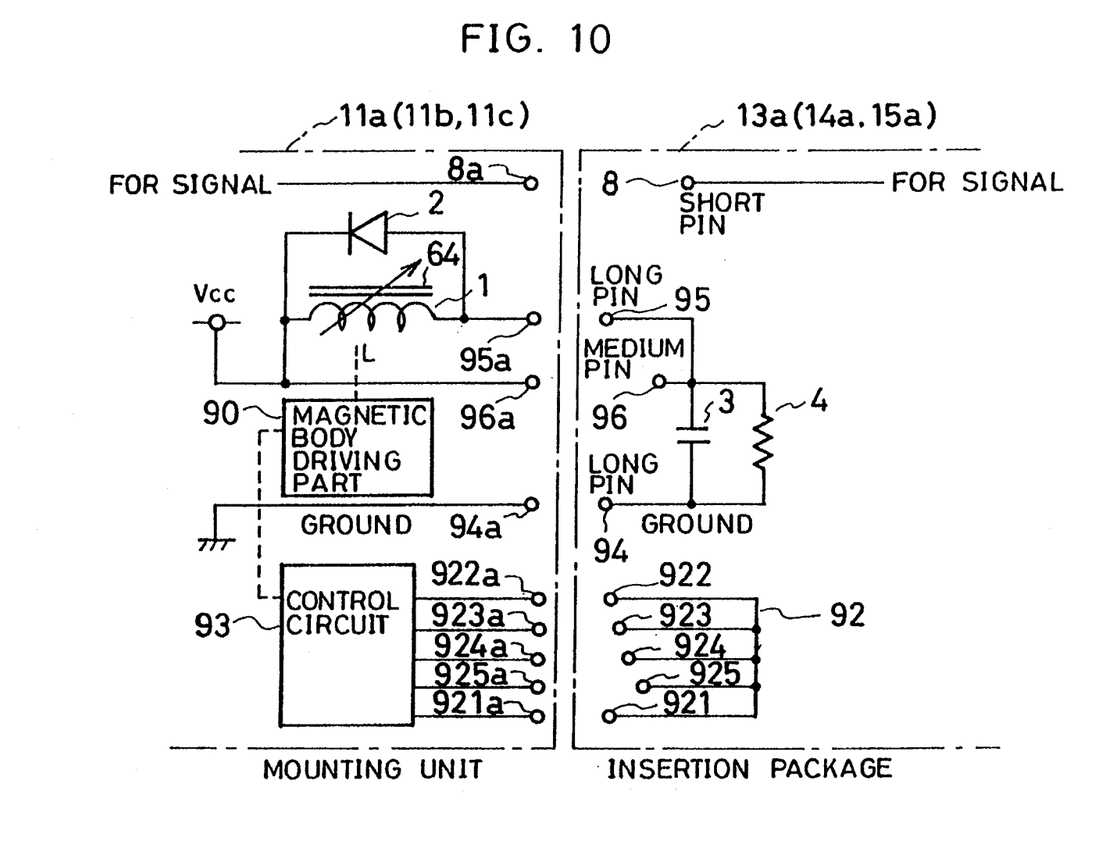
FIG. 10 is a circuit diagram showing the connectors of the mounting unit and the insertion package of Embodiment 4.

FIG. 10 shows a live insertion circuit according to Embodiment 4 of the present invention. In the figure, reference numeral 1 represents a variable inductor comprising a movable magnetic body and whose inductance is variable. A magnetic body driving portion 90 operates on an output signal from a control circuit 93 to move the movable magnetic body, whereby an inductance of the variable inductor 1 is changed. Reference numeral 92 represents a position detection terminal having a plurality of pins different in length between a long pin and a medium pin. The above-mentioned control circuit 93 detects how far an insertion operation proceeds through connection between a terminal thereof and the position detection terminal 92, namely the condition of connection between terminals in the process of connection between the mounting unit 11 and the insertion packages 13, 14, 15, and controls an inductance of the variable inductor 1 based on the detected connection condition. The pins 921, 922, 923, 924, 925 of the above-described position detection terminal 92 are engaged with the terminals 921a, 922a, 923a, 924a, 925a, respectively, in the process of inserting the connectors 13a, 14a, 15a, and short-circuited. If a plurality of resistors connected in series in the control circuit 93 are configured to be short-circuited in succession by this, the positions of the connectors 13a, 14a, 15a to be inserted can be identified by the detection of a voltage of this series circuit. When a magnet is used as a magnetic body driving circuit 90 and coupled to the movable magnetic body 64 within the variable inductor 1, an inductance of the variable inductor 1 can be changed according to the positions of the connectors 13a, 14a, 15a to be inserted.

A description is subsequently given of the operation of Embodiment 4. It is supposed that an inductance of the variable inductor 1 is sufficiently high at the beginning. For instance, when the insertion package 13 is inserted into the mounting unit 11, the long-pin terminals 94, 95 are first connected to the terminals 94a, 95a. At the same time, the control circuit 93 detects that the pin 921 of the position detection terminal 92 is engaged with the terminal 921a and that the long-pin terminals 94, 95 are engaged with the terminals 94a, 95a. When the insertion package 13 continues to be inserted, the number of short-circuited pins of the terminal 92 increases as the insertion package 13 is inserted farther. In other words, the control circuit 93 can detect how far the insertion package 13 is inserted. Based on this detection, the control circuit 93 controls an inductance of the variable inductor 1 by moving the movable magnetic body by means of the magnetic body driving portion 90, and reduces an inductance of the variable inductor 1 to an extremely small value when the medium-pin terminal 96 is engaged with the terminal 96a. With such an operation, an extremely large surge current can be prevented from reaching the insertion package.

Embodiment 5

Figure 11:
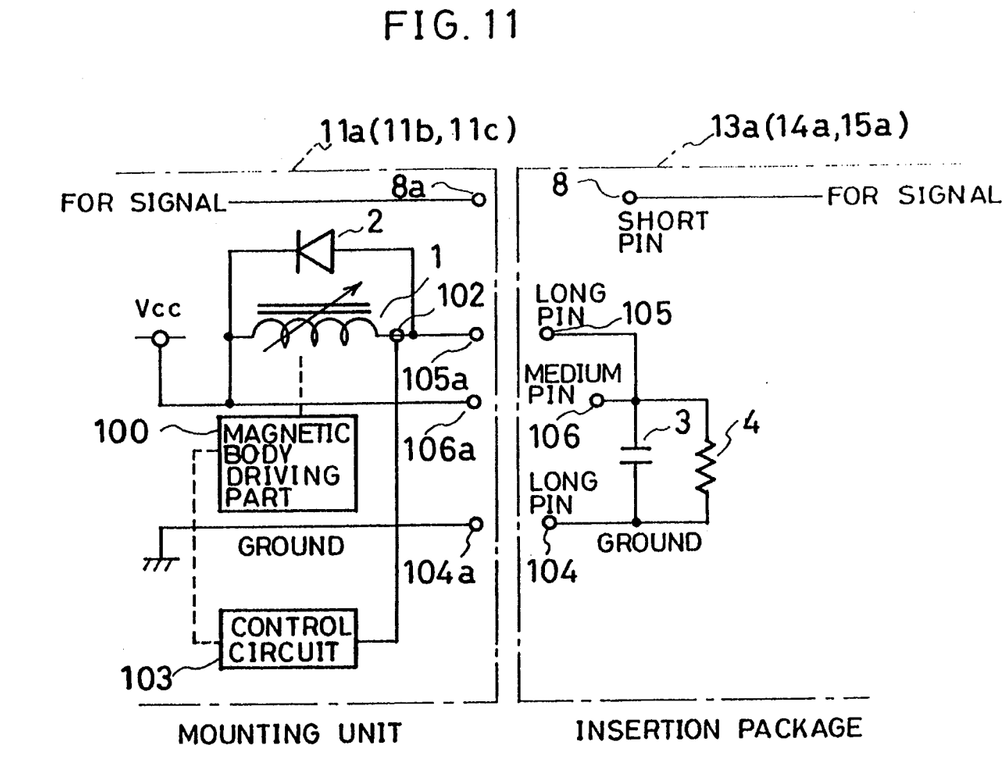
FIG. 11 is a circuit diagram showing the connectors of the mounting unit and the insertion package of Embodiment 5.

FIG. 11 shows a live insertion circuit according to Embodiment 5. In the figure, reference numeral 1 represents a variable inductor comprising a movable magnetic body and whose inductance is variable. A magnetic body driving portion 100 operates on an output signal from a control circuit 103 whereby an inductance of the variable inductor 1 is changed. Reference numeral 102 represents a potential detector for detecting a potential of an inductor terminal. Numeral 103 represents the above-mentioned control circuit for controlling an inductance of the variable inductor 1 in response to an input from the potential detector 102.

A description is given of the operation of Embodiment 5. It is supposed that an inductance of the variable inductor 1 is sufficiently high at the beginning. For instance, when the insertion package 13 is inserted into the mounting unit 11, the long-pin terminals 104, 105 are engaged with the terminals 104a, 105a, respectively. At the beginning of an insertion process, an initial charge of the bypass capacitor 3 is almost "0" and accordingly, a value of the potential detector 102 is also almost "0". However, as the bypass capacitor 3 is charged, a potential of the potential detector 102 is raised. The control circuit 103 calculates a rise in potential per unit time. If the rise is too large, the control circuit 103 maintains a high inductance of the variable inductor 1, and if the rise is too small, the control circuit 103 controls the magnetic body driving portion 100 to reduce the inductance. This control is effected by moving the movable magnetic body by means of the magnetic body driving portion 100. In this way, the bypass capacitor 3 is fully charged until the medium-pin terminal 106 is engaged with the terminal 106a to prevent the generation of a surge current.

Embodiment 6

Figure 12:
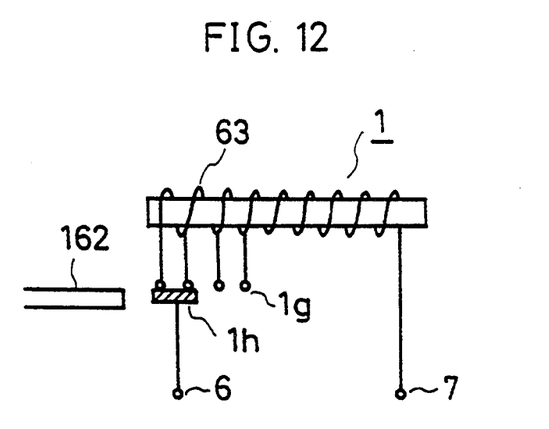
FIG. 12 is a structural diagram of the variable inductor of Embodiment 6.

In the above-described Embodiments 1 to 5, the movable magnetic body 64 is provided to change an inductance of the variable inductor 1. As shown in FIG. 12, a plurality of taps 1g may be provided on the coil portion 63 of the variable inductor 1, and a contact piece 1h in sliding contact with the taps 1g is moved by means of a rod 162 so that an inductance of the variable inductor 1 can be varied by switching the connection between the taps 1g and the contact piece 1h. The structure of the live insertion circuit according to Embodiment 6 is simpler than those of the above-described Embodiments 1 to 5 which comprise the movable magnetic body 64.

Embodiment 7

Figure 13:
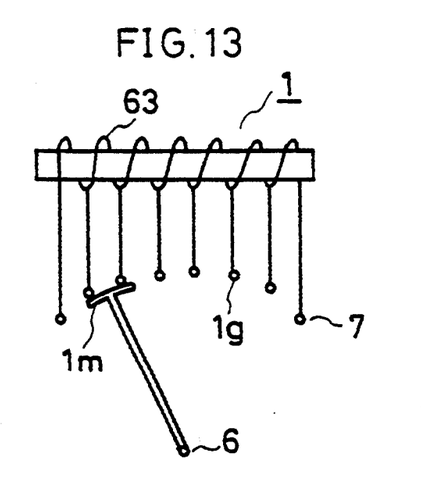
FIG. 13 is a structural diagram of the variable inductor of Embodiment 7.

In the above-described Embodiments 4 and 5, the movable magnetic body 64 provided on the variable inductor 1 is moved by the magnetic body driving portion. As shown in FIG. 13, a plurality of taps 1g are provided on the coil portion 63 of the inductor 1 and a rotary contact piece 1m in sliding contact with the taps 1g is moved by an unshown motor so that the connection between the taps 1g and the rotary and sliding contact piece 1m can be switched. In this case, the motor may be driven by an output signal from the control circuit.

As described on the foregoing pages, in Embodiment 1, to insert an insertion package into a mounting unit in live insertion, an inductance of a variable inductor is kept high at the beginning of an insertion process, and is reduced thereafter and to an extremely low value finally when a load is directly connected to a power line. As a result, when long-pin terminals are first connected, and then a medium-pin terminal is connected, generation of a surge current is prevented. In addition, since an inductance can be varied, a time constant can be changed, thus making it possible to reduce the time required for supply current to reach a stationary level without the generation of a surge current.

In Embodiment 2, a medium-pin terminal is omitted when the accuracy of an inductance of the variable inductor can be ensured, or when a load capacity is small. Therefore, the same effect as in Embodiment 1 can be obtained and yet the structure of this embodiment can be simplified. This makes it possible to use unused pin terminals for another purpose.

In Embodiment 3, the high-density packaging of an insertion package which is normally high in packaging density can be prevented by installing a live insertion circuit on a mounting unit and providing a pin length identification function to the insertion package, thus making it possible to facilitate design of the insertion package and to achieve the same effect as in Embodiment 1.

In Embodiment 4, since a position detection terminal is provided, the movable magnetic body cannot be moved only in a linear fashion unlike Embodiment 1. If the insertion position-current characteristic of a load to be connected is investigated in advance, an inductance of the variable inductor can be changed non-linearly according to the positions of the terminals, thus controlling a current to a desired value.

In Embodiment 5, since a potential detector is attached to a live insertion circuit, an inductance of the variable inductor can be controlled by feeding back a change in the amount of potential per unit time. As a result, a surge current can be prevented accurately without previous investigation into the insertion position-current characteristic of the load.

In Embodiment 6, since taps are provided on the coil portion of the variable inductor, a contact piece in sliding contact with the taps is moved by a rod to change an inductance. Therefore, the need of the movable magnetic body is eliminated with the result of a simple mechanical structure.

In Embodiment 7, since taps are provided on the coil portion of the variable inductor, a rotary contact piece in sliding contact with the taps is moved by a motor or the like to change an inductance. Therefore, the need of the movable magnetic body is eliminated with the result of a much simpler mechanical structure.

In the above-described embodiments, the position of the insertion package may be optically detected by means of a phototransistor or the like.

According to a first embodiment, since an inductor provided between a power circuit and a load is a variable inductor and operation means is provided to control an inductance of the variable inductor such that an inductance is kept high when the connector of the unit contacts the connector of the package and lowered after these connectors are connected, an inductance can be changed to an appropriate value when long-pin terminals or a medium-pin terminal of the connector of the package are connected to the terminals of the connector of the unit in live insertion, whereby a sudden change in current can be prevented. Therefore, protection of terminals, stabilization of power supply system, and prevention of noise interference are possible.

According to another embodiment, since the variable inductor comprises a hollow coil portion and a movable magnetic body which is movably inserted into the coil portion, and the operation means is positioned facing the end of the movable magnetic body to move the movable magnetic body out of the coil portion at the time of inserting the connector, an inductance of the movable inductor can be changed by moving the movable magnetic body when the package is inserted into the unit in live insertion. Thereby, the same effect as in claim 1 can be obtained.

According to a still further embodiment, the variable inductor comprises a hollow coil portion and a movable magnetic body which is movably inserted into the coil portion, and the operation means comprises a control circuit for generating an output signal according to the position of the connector of the package at the time of inserting the connector and a magnetic body driving portion responsive to the output signal from the control circuit to change the position of the movable magnetic body. Therefore, the same effect as in the first embodiment can be obtained. In addition to the effect as in the first embodiment, an inductance of the variable inductance can be changed non-linearly according to the insertion condition of the package into the unit, thus making it possible to control a current to a desired value.

In still another embodiment, the variable inductor comprises a hollow coil portion and a movable magnetic body which is movably inserted into the coil portion, and the operation means comprises a potential detector for detecting a potential between the variable inductor and a load at the time of inserting the connector, a control circuit for generating a signal corresponding to a potential detected by the potential detector, and a magnetic body driving portion responsive to the output signal from the control circuit to change the position of the movable magnetic body. Therefore, in addition to the same effect as the first embodiment, a surge current can be prevented accurately without previous investigation into the insertion position-current characteristic of a load.

What is claimed is:

1. A live insertion circuit capable of connecting a load to a power circuit by inserting a connector of a package having the load for carrying out a predetermined operation into a connector of a unit having the power circuit and inserting an inductor between the power circuit and the load at the time of connection, wherein said inductor is a variable inductor and operation means is provided to maintain a high inductance of said variable inductor when the connector of said unit is initially connected with the connector of said package and said operation means reduces an inductance of said variable inductor until connection is complete.

2. The live insertion circuit according to claim 1, wherein said variable inductor comprises a hollow coil portion and a movable magnetic body which is movably inserted into the coil portion, and said operation means is positioned facing the end of the movable magnetic body to pull the movable magnetic body out of the coil portion at the time of inserting the connector.

3. The live insertion circuit according to claim 1, wherein said variable inductor comprises a hollow coil portion and a movable magnetic body which is movably inserted into the coil portion, and said operation means comprises a control circuit for generating an output signal corresponding to the position of the connector of the package at the time of inserting the connector and a magnetic body driving portion responsive to the output signal from the control circuit to change the position of the movable magnetic body.

4. The live insertion circuit according to claim 1, wherein said variable inductor comprises a hollow coil portion and a movable magnetic body which is movably inserted into the coil portion, and said operation means comprises a potential detector for detecting an electric potential between said variable inductor and said load at the time of inserting the connector, a control circuit for generating an output signal corresponding to a potential detected by the potential detector, and a magnetic body driving portion responsive to the output signal from the control circuit to change the position of the movable magnetic body.

5. The live insertion circuit according to claim 1, wherein said variable inductor comprises a coil portion having a plurality of taps and a contact piece for changing an inductance of said variable inductor by short-circuiting contact points between the contact piece and the taps in succession along the movement of the piece, and said operation means is positioned facing the end of the piece to short-circuit contact points between the piece and the taps in succession in the travelling direction thereof at the time of inserting the connector.

6. The live insertion circuit according to claim 1, wherein said variable inductor comprises a coil portion having a plurality of taps and a contact piece for changing an inductance of said variable inductor by short-circuiting contact points between the contact piece and the taps along the movement of the piece, and said operation means comprises a control circuit for generating an output signal corresponding to the position of the connector of the package at the time of inserting the connector and a contact piece driving portion responsive to the output signal from the control circuit to change the position of the piece and to short-circuit contact points between the piece and the taps in succession in the travelling direction thereof.

7. The live insertion circuit according to claim 1, wherein said variable inductor comprises a hollow coil portion, and said operation means comprises a movable magnetic body which is inserted into a hollow area of the hollow coil portion and is positioned facing the hollow area of the hollow coil portion so that said operation means can be inserted into the hollow area of the coil portion at the time of inserting the connector.

8. The live insertion circuit according to claim 2, wherein said operation means is provided on the unit and the hollow coil portion and the movable magnetic body are provided on the package.

9. The live insertion circuit according to claim 2, wherein said operation means is provided on the package, and the hollow coil portion and the movable magnetic body are provided on the unit.

10. The live insertion circuit according to claim 2, wherein said operation means is made of a non-magnetic material having such a diameter as to be inserted into the hollow portion of the coil portion.

11. The live insertion circuit according to claim 2, wherein first and second female terminals to be connected to a power source side of the power circuit and a third female male terminal to be connected to a ground side of the power circuit are provided on the unit; first, second and third male terminals at positions facing the respective terminals of the unit, the variable inductor and a variable capacitor are provided on the package; the variable capacitor is charged from the power circuit through a variable reactor at the time of connecting the first and third male terminals of the package to the first and third female terminals of the unit; and the variable capacitor is charge directly from the power circuit to supply a current to the load at the time of connecting the second and third male terminals of the package to the second and third female terminals of the unit.

12. The live insertion circuit according to claim 2, wherein first and second male terminals to be connected to a power source side of the power circuit and a third male terminal to be connected to a ground side of the power circuit are provided on the unit; first, second and third female terminals at positions facing the respective terminals of the unit, the variable inductor and a variable capacitor are provided on the package; the variable capacitor is charged from the power circuit through a variable reactor at the time of connecting the first and third female terminals of the package to the first and third male terminals of the unit; and the variable capacitor is charged directly from the power circuit to supply a current to the load at the time of connecting the second and third female terminals of the package to the second and third male terminals of the unit.

13. The live insertion circuit according to claim 11, wherein only first and third female terminals are provided on the unit and only first and third male terminals are provided on the package when an impedance of the variable inductor can be reduced sufficiently, or when a surge current from the power circuit to the load is small due to a small load capacity, at the time of connecting the connector of the package to the connector of the unit.

14. The live insertion circuit according to claim 11, wherein only first and third male terminals are provided on the unit and only first and third female terminals are provided on the package when an impedance of the variable inductor can be reduced sufficiently, or when a surge current from the power circuit to the load is small due to a small load capacity, at the time of connecting the connector of the package to the connector of the unit.

* * * * *

UNITED STATES PATENT AND TRADEMARK OFFICE
CERTIFICATE OF CORRECTION

PATENT NO. : 5,383,081
DATED : January 17, 1995
INVENTOR(S) : Naofumi Nishikawa

It is certified that error appears in the above-indentified patent and that said Letters Patent is hereby corrected as shown below:

In the Claims: Col. 2, line 18, "The," should be --; Col. 11, line 14 (claim 11), "male" should be deleted; Col. 11, line 23 (claim 11), "charge" should be -- charged --.

Signed and Sealed this

Twenty-fifth Day of April, 1995

Attest:

BRUCE LEHMAN

*Attesting Officer*     *Commissioner of Patents and Trademarks*